United States Patent [19]

McTavish

[11] 4,350,349

[45] Sep. 21, 1982

[54] ROD PACKING

[75] Inventor: James C. McTavish, Santa Barbara, Calif.

[73] Assignee: Harry A. Robertson, Jr., Georgetown, Colo.

[21] Appl. No.: 233,938

[22] Filed: Feb. 12, 1981

[51] Int. Cl.³ .............................................. F16J 15/24
[52] U.S. Cl. .................................................. 277/199
[58] Field of Search ........................ 277/194, 195, 199

[56] References Cited

U.S. PATENT DOCUMENTS

| 588,681 | 8/1897 | Leary | 277/199 |
|---|---|---|---|
| 865,998 | 9/1907 | Cook | 277/199 |
| 892,978 | 7/1908 | Carter | 277/195 |
| 1,967,573 | 7/1934 | Fox | 277/199 |
| 2,705,178 | 3/1955 | Bergeron | 277/194 |
| 3,305,241 | 2/1967 | Hart | 277/199 |
| 3,836,158 | 9/1974 | Davison et al. | 277/199 |

Primary Examiner—Robert I. Smith
Attorney, Agent, or Firm—Edwin L. Spangler, Jr.

[57] ABSTRACT

This invention relates to an improved rod packing characterized by a single segmented ring having three circumferentially-grooved 120° segments held together in abutted end-to-end circle-forming relation by an endless spring seated in the groove, a circumferentially-grooved chordal segment formed integral with each ring-forming segment on one face thereof, three circumferentially-grooved generally wedge-shaped segments adapted to bridge the joint between the ring segments while cooperating with the chordal segments to define a second ring in face-to-face relation to the first of essentially the same dimensions, and another endless spring holding the elements of the second ring in circle-forming relation seated in the grooves thereof.

10 Claims, 4 Drawing Figures

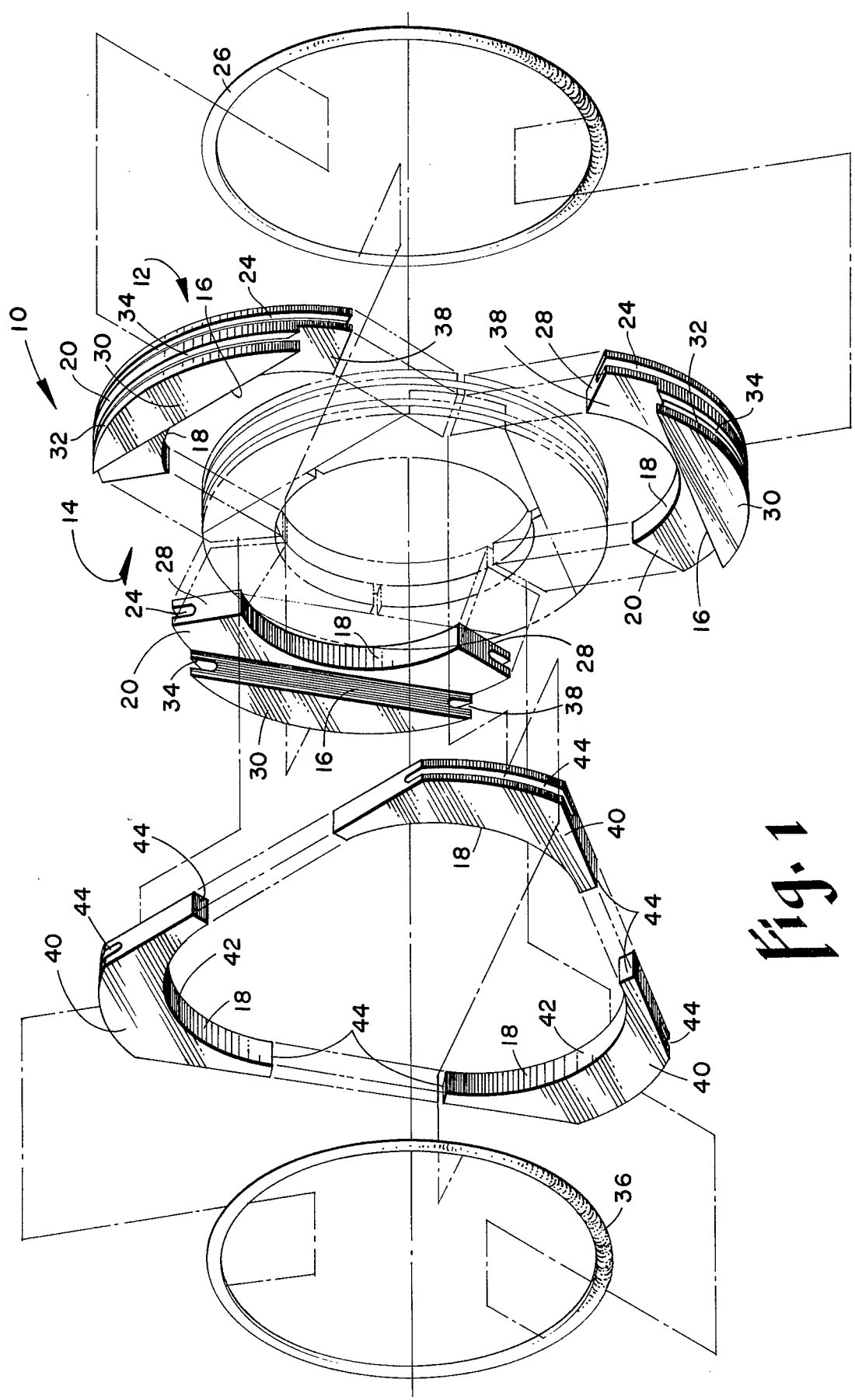

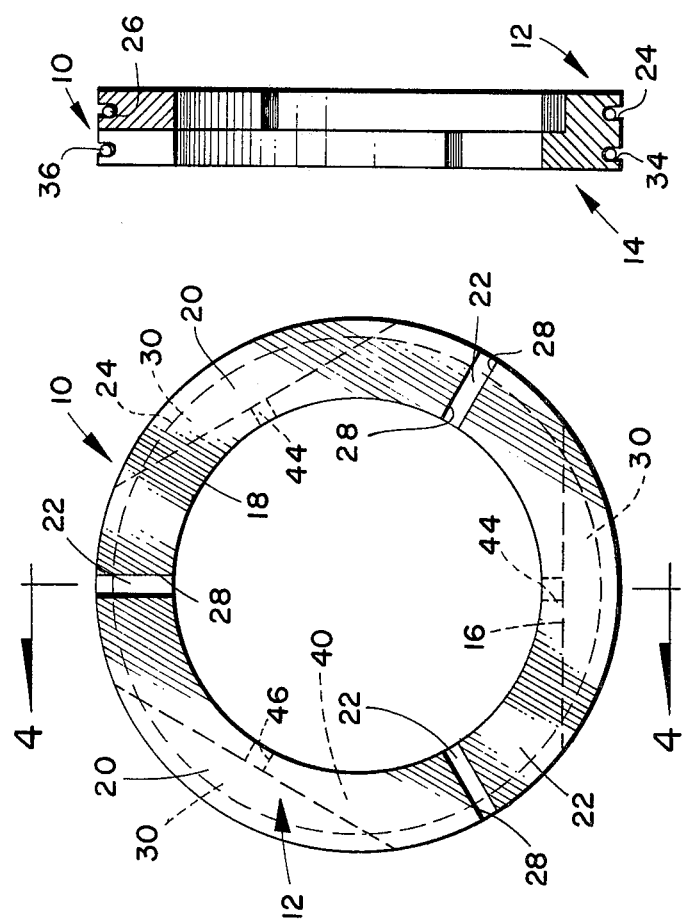
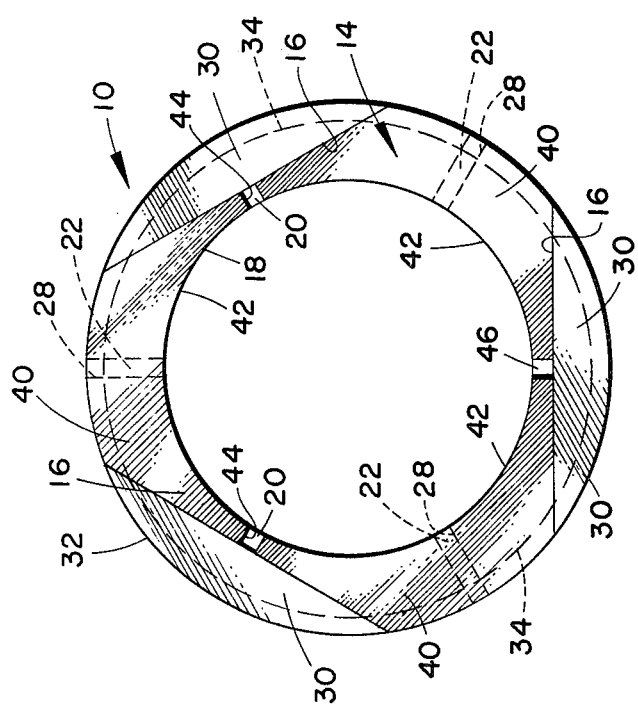

ROD PACKING

Rod packings are notoriously old in the art and they have as their prime function that of sealing the piston rods of compressors and the like against the escape of gaseous working fluids from within the high pressure compartment through the opening within which the rod reciprocates. The vapor-tight seal is made on the i.d. of the packing and the general approach has usually been to cut a ring into arcuate segments that encircle the rod and are biased thereagainst into seal-forming relation by a circumferential spring known as a "garter spring". By leaving a small gap between adjacent segments, they can close in upon the rod as they wear thus maintaining the proper sealed relationship. Otherwise, the life of such rings would be extremely short since they would soon wear to the point where leakage would occur along the rod.

Vapors escaping through the generally radial gaps are intercepted by a second segmented ring, generally of different design, whose joints extend in different directions, i.e. tangentially as opposed to radially, but in any event are staggered so as to not register with one another. In the usual installation, the radially-cut ring is on the pressure side while the tangentially-cut one is downstream of the pressure. Both have radial cuts with gaps to accommodate wear; however, those on the tangentially-cut ring are at the bore and preferably located midway between the gaps in the radially-cut ring. Not uncommonly, the two rings thus arranged in face-to-face relation are maintained in a predetermined orientation relative to one another by an alignment pin of some sort. More than one set of these rings are quite common, each set being housed in a separate annular groove.

These rings are characterized as single or double-acting depending upon whether they can have only one side or both facing the pressure. In addition these rings may be made of various materials, even metals like, for example, cast iron and hi-lead bronze although many are made of plastics like carbon-filled tetrafluoroethylene and even Nylon for some applications like anti-extrusion rings.

With the foregoing as background, it will be helpful to examine the state of the art with respect to rod packings of the type forming the subject matter hereof. To begin with and most important is the fact that by far the majority of all rod packings require two separate segmented rings, a radial cut one on the pressure side and a tangent cut one downstream of the latter. These rings each have their own garter spring biasing the segments into vapor-tight sealed contact with the piston rod and some sort of connection between the two rings to keep them properly oriented relative to one another. Examples of packings with radially and tangentially-cut paired ring sets are found in the U.S. Pat. to Walker, No. 525,434; Morris, No. 1,426,493; Badeker, No. 1,370,679; and Holmes, No. 654,541, the latter being especially pertinent to the rod packing forming the subject matter hereof. Other prior art rod packings like those of Bentley U.S. Pat. No. 1,813,016; Mallory U.S. Pat. No. 1,494,004 and Morris U.S. Pat. No. 1,309,075 appear to eliminate the radially-cut ring altogether and use instead a pair of substantially identical tangentially-cut rings linked together such that the joints between segments are misaligned. Still other prior art packings use a single step-cut ring like that of Raynsford U.S. Pat. No. 581,138. An example of a single tangentially-cut ring is found in Doperalski et al U.S. Pat. No. 2,860,018; however, this is not a rod packing at all but rather a piston ring sealing against the cylinder wall on the o.d. thereof.

For purposes of the instant invention, the two most pertinent prior art patents known to applicant are those of Mallory and Holmes, both of which have been mentioned previously, and particularly the latter. Both of these patents employ two separate rings, of course, which is fundamentally different than that which is described and claimed herein. In addition, however, they both have tongue and groove interlocks at all joints between adjacent segments; whereas, the instant rod packinng is totally devoid of such interlocks as well as any orientation pins since none is required in a segmented assembly where the radially-cut and portions of the chordally-cut rings are formed integral with one another.

Ordinarily integrating parts into a unitary structure does not rise to the dignity of patentable invention, however, in this instance, significant and unexpected advantages are realized by so doing. To begin with, the seal maintains its integrity despite the loss of one of the two garter springs while the prior art two-ring sets would be rendered totally ineffective for their intended purpose should either spring fail. The need for an orientation pin or pins is, likewise, eliminated since the integral nature of the radially-cut ring and portions of the chordally-cut one maintains the proper staggered relation between the radial and chordal joints at all times. Moreover, conventional ring sets equipped with alignment pins place an axial restraint upon the rings so interconnected which, to a degree at least, inhibits their ability to maintain vapor-tight contact with the rod.

While these two prior art patents show tongue and groove connections at the joints between segments instead of dowel pins like those of Morris which are somewhat more common, the effect is essentially the same, namely, the tendency for the segments to "hang-up" so to speak and thus fail to mate properly with one another and the rod. This is particularly true of tangentially-cut rings like those of Morris. The instant packing ring, on the other hand, due to its integrally-formed nature, has the segments of the two rings in fixed back-to-back relation while leaving portions of each exposed to define supporting surfaces that keep the segments riding thereon properly positioned without the need for dowel pin or tongue and groove connections between adjacent segments.

Another significant advantage of the instant ring is that its segments are completely interchangeable since it need not be rebored as do the prior art packing rings. Not only does this mean a somewhat reduced cost of manufacture but, in addition, it saves assembly time since the user is not faced with the necessity for matching parts. The ease of installation is also enhanced, of course, by the fact that only one ring need be installed instead of the usual two.

Last, but by no means least, is the completely unexpected discovery that, apparently due to the integral nature of the ring assembly, the parts wear at the same rate thus resulting in a longer-lived packing.

It is, therefore, the principal object of the present invention to provide a novel and improved rod packing.

A second objective is the provision of a packing of the character aforementioned that uses what can be viewed as a single segmented ring with staggered backto-back segments to provide all the sealing qualities heretofore achieved only by two separate ones.

Another object is to provide a unitary assembly incorporating both radially-cut and chordally-cut segments cooperating with one another and with some wedge-shaped inserts to define a single ring.

Still another objective of the within described invention is that of providing a high pressure rod seal which has interchangeable parts.

An additional object of the invention herein disclosed and claimed is to provide a rod packing that has no interlocking parts to hang up and which remains fully functional even through the loss of either one of the two garter springs.

Further objects of the invention are to provide a rod packing that is versatile, easy to install, competitive in price, dependable, long wearing, compact, and, most of all, effective to maintain a vapor-tight seal.

Other objects will be in part apparent and in part pointed out specifically hereinafter in connection with the description of the drawings that follows, and in which:

FIG. 1 is an exploded perspective view of the rod packing;

FIG. 2 is a rear elevation showing the chordal-cut face remote from the pressure;

FIG. 3 is a front elevation showing the radially-cut face that opposes the pressure; and, FIG. 4 is a diametrical section taken along line 4—4 of FIG. 3.

Referring next to the drawings for a detailed description of the invention, reference numeral 10 has been chosen to broadly designate the rod packing in its entirety while numerals 12 and 14 similarly denote what will be denominated here as the radially-cut and chordally-cut faces thereof, respectively. The term "chordal" as opposed to "tangential" is deemed more appropriate at least in the present instance, because none of the three equiangularly-spaced chordal shoulders 16 is, in fact, tangent to anything including the circular bore 18.

Looking first at the radially-cut face 12, and with particular reference to FIGS. 1 and 3 for this purpose, the segmented ring appearing in full lines in FIG. 3 is not unlike many other packing rings in that it includes three arcuate segments 20, each of which encompasses something less than 120° in angular extent. These segments when arranged in spaced end-to-end relation as shown so as to leave a narrow gap 22 between adjacent segments, cooperate in the well-known way to define the circular bore 18 that receives the piston rod (not shown) to form a vapor-tight seal therewith. An endless spring 26, also old in the art, is received within a peripheral groove 24 bordering the ring thus formed and functions to bias the ring segments into vapor-tight sealed engagement with the cylindrical rod surface. Gaps 22 between the ends 28 of the segments are carefully sized in accordance with well established practices to accommodate wear within the i.d. of the segments 20 thus allowing them to move closer together and maintain vapor-tight contact with the piston rod.

It is not what will be denominated the "front" face 12 of ring 10 revealed in FIG. 3 where the differences in the instant rod packing become most apparent, but instead, on the rear face thereof, particularly as revealed in FIGS. 1 and 4 where it can be seen that the chord-shaped ledges are formed integral with the arcuate segments 20 projecting from the rear faces thereof at a point midway between their ends 28. These chord-shaped ledges 30 have their arcuate outside margins 32 grooved as indicated at 34 to receive a second endless spring 36 as shown. Of course, since chord-shaped ledges 30 are a part of the arcuate segments 20, spring 36, among other things, coacts with spring 24 to bias the latter segments against the rod. Spring 36 also bridges the gap 38 between the ledges 30 where it engages wedge-shaped inserts 40 biasing their inside arcuate surfaces 42 into vapor-tight sealed relation with the rod surface and which is best seen in FIG. 1. These inserts are peripherally-grooved at 44 to form continuations of grooves 34 in the ledges 30. A primary function of spring 36 is, of course, that of biasing the wedge-shaped segments into sealed contact with the rod because, obviously, spring 26 cannot do so directly being out of contact therewith. Nevertheless, as important as spring 36 is to the assembly, the packing would not fail to seal even if it were missing due to the bias exerted by spring 26 acting to urge the arcuate segments 20 inwardly thus doing the same to the ledges with convergent adjacent shoulders 16 thereof coacting to not only hold, but squeeze the inserts in against the rod. In other words, the integral nature of the ledges 30 causes them to respond to the same biasing force (spring 26) that acts to close gap 22 between segments 20 by squeezing the wedges in against the rod. The garter spring seated in the groove encircling Holmes' tangent ring segments also cooperate to bias his wedge-shaped segments inwardly to effectively reduce the o.d. of the ring; however, should this spring fail for some reason, the packing would fail also and the spring encircling the radially-cut segments e would be useless to maintain the required seal. In the instant packing, on the other hand, either of the two springs remains effective to maintain the integrity of the seal.

Wedge-shaped segments 40 have their inner circular sealing surfaces 42 shaped to define a circle the size of the o.d. of the rod they are to seal against when the ends 44 thereof lie in spaced relation as shown in FIG. 2. As the sealing surfaces wear, the gaps 46 between these ends 44 close to accommodate it as is common to the tangent cut rings of the prior art. The unique feature of the instant rod packing, once again, lies in forming the radially-cut and chord-shaped segments integral with one another in back-to-back relation such that the keys and keyways, dowels and dowel pin holes interlocking the prior art ring segments together can be eliminated along with the attendant problems associated therewith as well as the alignment pins necessary to maintain the two rings of the set in proper orientation relative to one another such that the gaps between the segments of one ring remain at all times misaligned with respect to those of the companion ring.

What is claimed is:

1. The rod packing which comprises: at least three flat-faced arcuate segments shaped to define a first ring with a first circular opening in the center thereof when assembled in spaced end-to-end relation, each of said segments having the same one face thereof provided with a projecting portion defining an inwardly-facing shoulder extending chordally so as to intersect the periphery thereof at points spaced inwardly of its opposite ends; a corresponding set of flat-faced wedge-shaped elements insertable between adjacent shoulders cooperating therewith when the arcuate segments lie in ring-forming relation to bridge the gaps between the ends thereof and form a second ring in face-to-face vapor-tight sealed relation alongside the first, said wedge-shaped elements in spaced end-to-end ring-forming relation also cooperating to define a second circular opening coaxial with the first and of substantially the same size; and tension means encircling one of said first and second rings operative to urge the segments closer together and hold the inside surfaces thereof bordering the central opening therein into vapor-tight sealed contact with a first cylindrical workpiece housed therein, and said adjacent projections responding to the same segment-closing bias by operatively wedging the wedge-shaped element therebetween into vapor-tight sealed engagement against a second cylindrical surface of the workpiece adjacent the first.

2. The rod packing as set forth in claim 1 wherein the segments are each slightly less than 120° in angular extent.

3. The rod packing as set forth in claim 1 wherein the flat faces of the arcuate segments and wedge-shaped elements remote from those in opposed seal-forming relation to one another are coplanar.

4. The rod packing as set forth in claim 1 wherein at least one of the first and second rings is encircled by a peripheral groove and wherein the tension means comprises an endless spring seated in said groove.

5. The rod packing as set forth in claim 1 wherein the outside margins of the projections parallel the outside margins of the arcuate segments alongside thereof.

6. The rod packing as set forth in claim 1 wherein the projections are centered between the opposite ends of the arcuate segments from which they depend.

7. The rod packing as set forth in claim 1 wherein the projections and wedge-shaped elements cooperate in assembled relation to define a substantially circular outer edge having an endless groove therein, and wherein said tensioning means comprises an endless spring seated within said groove.

8. The rod packing as set forth in claim 1 wherein the arcuate segments are peripherally-grooved alongside the projections depending therefrom, said grooves co-operating with one another to define an endless groove for the biasing means with said arcuate sections assembled in ring-forming relation.

9. The rod packing as set forth in claim 1 wherein the outside margins of both the first and second rings are peripherally-grooved with said grooves lying in side-by-side spaced relation and wherein a tensioning means is seated within each of said side-by-side grooves.

10. The rod packing as set forth in claim 1 wherein the arcuate elements cooperate with one another in spaced end-to-end relation to bridge the spaces left between the ends of the wedge-shaped elements thereby cooperating therewith, with the face-to-face seal therebetween and with the surfaces thereof in sealed engagement with cylindrical surfaces of the workpiece to define a continuous annular vapor-tight seal around the latter.

* * * * *